(12) United States Patent
Galloway (10) Patent No.: US 7,753,973 B2
(45) Date of Patent: Jul. 13, 2010

(54) PROCESS AND SYSTEM FOR CONVERTING CARBONACEOUS FEEDSTOCKS INTO ENERGY WITHOUT GREENHOUSE GAS EMISSIONS

(76) Inventor: Terry R. Galloway, 6801 Sherwick Dr., Berkeley, CA (US) 94705-1744

( * ) Notice: Subject to any disclaimer, the term of this patent is extended or adjusted under 35 U.S.C. 154(b) by 883 days.

(21) Appl. No.: 11/636,930

(22) Filed: Dec. 11, 2006

(65) Prior Publication Data

US 2007/0099038 A1 May 3, 2007

Related U.S. Application Data

(63) Continuation-in-part of application No. 10/719,504, filed on Nov. 21, 2003, now Pat. No. 7,220,502, which is a continuation-in-part of application No. 10/602,536, filed on Jun. 23, 2003, now Pat. No. 7,132,183, and a continuation-in-part of application No. 10/184,264, filed on Jun. 27, 2002, now abandoned.

(60) Provisional application No. 60/749,306, filed on Dec. 12, 2005.

(51) Int. Cl.
*H01M 8/06* (2006.01)
(52) U.S. Cl. ............................ 48/127.1; 429/17; 429/20
(58) Field of Classification Search ............... 48/127.1, 48/197 R–197 A; 429/12–46
See application file for complete search history.

(56) References Cited

U.S. PATENT DOCUMENTS

| | | | | | |
|---|---|---|---|---|---|
| 4,921,765 | A | * | 5/1990 | Gmeindl et al. | 429/16 |
| 5,423,891 | A | * | 6/1995 | Taylor | 48/197 R |
| 2004/0247509 | A1 | * | 12/2004 | Newby | 423/240 S |
| 2005/0132883 | A1 | * | 6/2005 | Su et al. | 95/235 |

* cited by examiner

*Primary Examiner*—Alexa D Neckel
*Assistant Examiner*—Imran Akram
(74) *Attorney, Agent, or Firm*—Richard Dannells; Manatt, Phelps, Phillips (57) ABSTRACT

The process of the invention converts carbonaceous feedstock such as coal, hydrocarbon oil, natural gas, petroleum coke, oil shale, carbonaceous-containing waste oil, carbonaceous-containing medical waste, carbonaceous-containing military waste, carbonaceous-containing industrial waste, carbonaceous-containing medical waste, carbonaceous-containing sewage sludge and municipal solid waste, carbonaceous-containing agricultural waste, carbonaceous-containing biomass, biological and biochemical waste, and mixtures thereof into electrical energy without the production of unwanted greenhouse emissions. The process uses a steam/$CO_2$ reformer operating in the exit range of at least 700° to about 1600° C. (1300-2900° F.) to convert the carbonaceous feedstock and a greenhouse gas stream into a synthesis gas comprising mostly carbon monoxide and hydrogen that contains poisons and the compounds that poison fuel cells. The syngas is sent to an interface zone to remove these poisons and other fouling compounds that are electrochemically oxidized in an electricity-producing fuel cell into an exit gas comprising carbon dioxide and water.

17 Claims, 3 Drawing Sheets

PROCESS AND SYSTEM FOR CONVERTING CARBONACEOUS FEEDSTOCKS INTO ENERGY WITHOUT GREENHOUSE GAS EMISSIONS

CROSS REFERENCE TO RELATED APPLICATION

This application claims the benefit of U.S. Provisional Patent Application No. 60/749,306 filed Dec. 12, 2005, and is a continuation-in-part of application U.S. Ser. No. 10/719,504 filed Nov. 21, 2003, now U.S. Pat. No. 7,220,502 both of which are incorporated herein by reference. The latter application is continuation-in-part of applications U.S. Ser. No. 10/602,536 filed Jun. 23, 2003; now U.S. Pat. No. 7,132,183 issued Nov. 7, 2006 (the '183 patent), and U.S. Ser. No. 10/184,264 filed Jun. 27, 2002, now abandoned published as Publication No. 2003/0022035 Jan. 30, 2003. This application is related to and contains common subject matter with U.S. Ser. No. 09/186,766 filed Nov. 5, 1998; now U.S. Pat. No. 6,187,465 issued Feb. 13, 2001 (the '465 patent), which claims the benefit of U.S. provisional application Ser. No. 60/064,692 filed Nov. 7, 1997.

FIELD OF INVENTION

This invention relates to gas processes that accomplish without emitting substantial greenhouse gases the conversion of a carbonaceous gas stream and a greenhouse gas into a synthesis gas (syngas), comprising hydrogen and carbon monoxide with no catalysts and or high pressure operations, and using the syngas in fuel cells to produce electrical energy.

BACKGROUND OF THE INVENTION

The burning of fossil fuels in boilers to raise high temperature, high-pressure steam that can be used to power turbo-electric generators produces a problem source of carbon dioxide and other greenhouse gases, e.g. methane, ozone and fluorocarbons. This fossil fuel combustion, especially of coal, needs a technological fix to avoid the emission of carbon dioxide and other greenhouse gases with their attendant undesirable release to the earth's atmosphere resulting in the absorption of solar radiation known as the greenhouse effect. Much of the world depends on coal for power. There have been significant efforts to develop clean coal technologies to greatly reduce the release of acid gases, such as sulfur oxides and nitrogen oxides. However, to date none of these clean coal demonstrations eliminate the emissions of carbon dioxide and other greenhouse gases. Efforts to use pure oxygen in power plants and gasification systems to avoid the diluting effects of nitrogen and to achieve higher efficiency suffers from the unacceptable cost of requiring an air separation plant and the problems of excessive temperatures in oxygen-fed combustion turbo-generators.

There is also widespread effort to increase the efficiency of power plants by utilizing advanced thermodynamic combined cycles, more efficient turbo-generators, improved condensers and cooling towers, and similar systems. A small portion of this effort involves the use of fossil fuel gasification processes, which are highly efficient because they avoid combustion and large combustion product emissions. Finally there is an effort by Westinghouse (Corporate literature, "SureCell®" 1996) and others to combine the use of advanced high temperature turbo-generators and fuel cells to accomplish conversion to electricity at efficiencies of about 70% instead of current conventional combined cycle power plants of about 47%.

The problem with the conventional approach with high temperature fuel cells, which commingles the exhaust from the anode and cathode is that nitrogen and $CO_2$ are mixed, making it very difficult and uneconomic to use the $CO_2$ for sequestration applications (see U.S. Dept. of Energy, National Energy Technology Laboratory, "Solid State Energy Conversion Alliance (SECA) Program," Pittsburgh, Pa., Aug. 29, 2006 and "7th Annual SECA Workshop and Peer Review," Philadelphia, Pa., Sep. 12-14, 2006). Under the U.S. Dept. of Energy SECA program the manufacturers have demonstrated that they can isolate the anode and cathode exhaust streams.

Today there is worldwide concern that the atmospheric buildup of carbon dioxide and other greenhouse gases will start to have serious environmental consequences for the earth's tropospheric temperature, global rainfall distribution, water balance, severe weather storms, and similar consequences. Technological solutions are being demanded throughout the world.

The worldwide research establishment, encouraged by government funding from various agencies, continues to be focused on identifying commercially attractive gas separation technologies to remove carbon dioxide from stack gases and also attractive chemistry that will utilize this carbon dioxide as a raw material to manufacture useful products. This has, indeed, been a very large challenge with poor successes as summarized by the review papers; see Michele Aresta, and Eugenio Quaranta, "Carbon Dioxide: A Substitute for Phosgene," Chem. Tech. pp. 32-40, March 1997, and Bette. Hileman, "Industry Considers $CO_2$ Reduction Methods", Chem. & Engr. News, pg. 30, Jun. 30, 1997. Trying to scrub the $CO_2$ from stack gases and trying to chemically react the recovered $CO_2$ clearly is not the right path of research because of the technical difficulty and the process expense of reacting carbon dioxide.

The scrubber approach alone is not sufficient for making syngas of high enough quality for fuel cells. Therefore, a great need exists for an improved cleanup system that will produce a syngas of high cleanliness to drive high temperature fuel cells, as well as to destroy a wide range of waste streams generated around the world while to convert this carbonaceous waste into useful hydrogen-rich syngas to drive a fuel cell to produce clean energy.

SUMMARY OF THE INVENTION

The process of the invention converts carbonaceous feedstock from fossil fuels and other combustible materials into energy without substantial production of unwanted greenhouse emissions. The present process comprises the following steps: (a) converting a carbonaceous feedstock and a greenhouse gas stream in a gasification unit to synthesis gas comprising mainly carbon monoxide and hydrogen, where the gasification unit is a non-catalytic, high temperature, gas-phase reactor operating at conditions to achieve a gas exit temperature of from at least 700° to about 1600° C. (1300-2900° F.); (b) passing at least a portion of the synthesis gas to an interface zone to remove compounds selected from the group consisting of sulfur-containing, silicon-containing, phosphorus-containing, nitrogen-containing, halogen containing compounds, and mixtures thereof from said synthesis gas; (c) electrochemically oxidizing at least a portion of the synthesis gas from the gasification unit in a first half-cell of a fuel cell to produce a first half-cell exit gas comprising carbon dioxide and water; (d) recovering the carbon dioxide from the first half-cell exit gas to serve as a greenhouse gas stream in step (a); and (e) electrochemically reducing an oxygen-containing gas in a second half-cell of the fuel cell completing the circuit and resulting in the production of electrical energy.

The interface zone comprises: (i) a high temperature filter operating in the range of about 400° to about 600° C. (750-1100° F.); (ii) a getter bed operating in the range of about 400° to about 600° C. (750-1100° F.), and (iii) a condenser operating in the range of about 0° to about 10° C. (32-50° F.).

In contrast to the present invention, the invention disclosed and claimed in the '183 patent has the disadvantage of taking at least a portion of the syngas directly to the fuel cell where the syngas has been found to contain poisons and other compounds that foul the fuel cell.

The present process takes advantage of a very unique property of fuel cells—namely, the two anodic and cathodic reactions are separated by an electronically conducting membrane that keeps the product gases separate. In this way, a combustible feed gas can be fully oxidized in the first half-cell of the fuel cell without being commingled with the final products of the air reduction in the second half-cell electrode, i.e., nitrogen. For example, in coal gasification, synthesis gas is formed consisting predominantly of hydrogen and carbon monoxide. This synthesis gas is fed into the first half-cell, i.e., the anode or negative terminal side, of the fuel cell, such as the solid oxide or molten carbonate types, where it is oxidized to water and carbon dioxide. These gases are not diluted by the typical nitrogen remaining after oxygen reduction in the second or remaining half-cell, i.e., the cathode side or positive terminal, of the fuel side. Nitrogen and combustion gases are commingled when combustion air is used in boilers or furnaces. Thus, in the fuel cell, the synthesis gas (syngas) is oxidized without being combusted with air and without being diluted by other gases. The fuel cell-produced water and carbon dioxide are simply separated from each other by condensing the liquid water and allowing the carbon dioxide to return to the gasifier. The carbon dioxide being injected into the high temperature gasifier undergoes a reaction with the high temperature carbonaceous feed to form more carbon monoxide, repeating the cycle.

The carbon dioxide in the fuel cell is easily kept separate from the air side and any nitrogen. The carbon dioxide can be recycled back to the gasifier in nearly pure form. Likewise steam in pure form can be recycled as well in different amounts under gasifier control system requirements to maintain the ideal hydrogen to carbon monoxide ratio in the range of about 0.7 to about 1.75. This helps maintain high hydrogen content in the gasifier so that a portion of the gasifier-produced syngas can be used downstream in a chemical reactor such as a Fischer Tropsch reaction system for the production of a variety of useful chemicals ranging from methanol to paraffin waxes. These in turn are used to make useful chemicals such as naphtha, gas oil, and kerosine, or agricultural chemicals or carbide abrasives. The latter are not ever burned in their lifecycle, and they sequester the carbon forever. Thus, the carbon monoxide is used to produce useful chemicals instead of discarding the valuable carbon source in the carbon dioxide. The carbon balance of the plant is maintained such that the mass of carbon input in the waste feed is equal to the carbon mass leaving the plant as valuable hydrocarbon products; not carbon dioxide.

What has been achieved is a chemical plant merged with a power plant that produces useful hydrocarbon products, high efficiency electric power without substantial carbon dioxide or other greenhouse gas emissions. And, most importantly gasification is much more flexible than a refinery or a coal boiler, since a wide variety of waste streams can be used as the feed material. Thus, this solves two serious problems: energy and greenhouse gases.

The process of the present invention is designed for use in a waste-to-energy plant using carbonaceous feedstocks such as coal; hydrocarbon oil; natural gas; petroleum coke; oil shale; carbonaceous-containing waste oil; carbonaceous-containing medical waste; carbonaceous-containing military waste including explosives, spent armaments, chemical and biological weapons agents, and unexploded ordinance; carbonaceous-containing industrial waste including hazardous waste, insecticides, pesticides, fumicides, algaecides, and the like; carbonaceous-containing sewage sludge and municipal solid waste (MSW); carbonaceous-containing agricultural waste; carbonaceous-containing biomass, biological and biochemical waste; and mixtures thereof.

BRIEF DESCRIPTION OF THE DRAWINGS

Advantages of the present invention will become apparent to those skilled in the art from the following description and accompanying drawings in which.

DETAILED DESCRIPTION OF THE INVENTION

Figure 1:
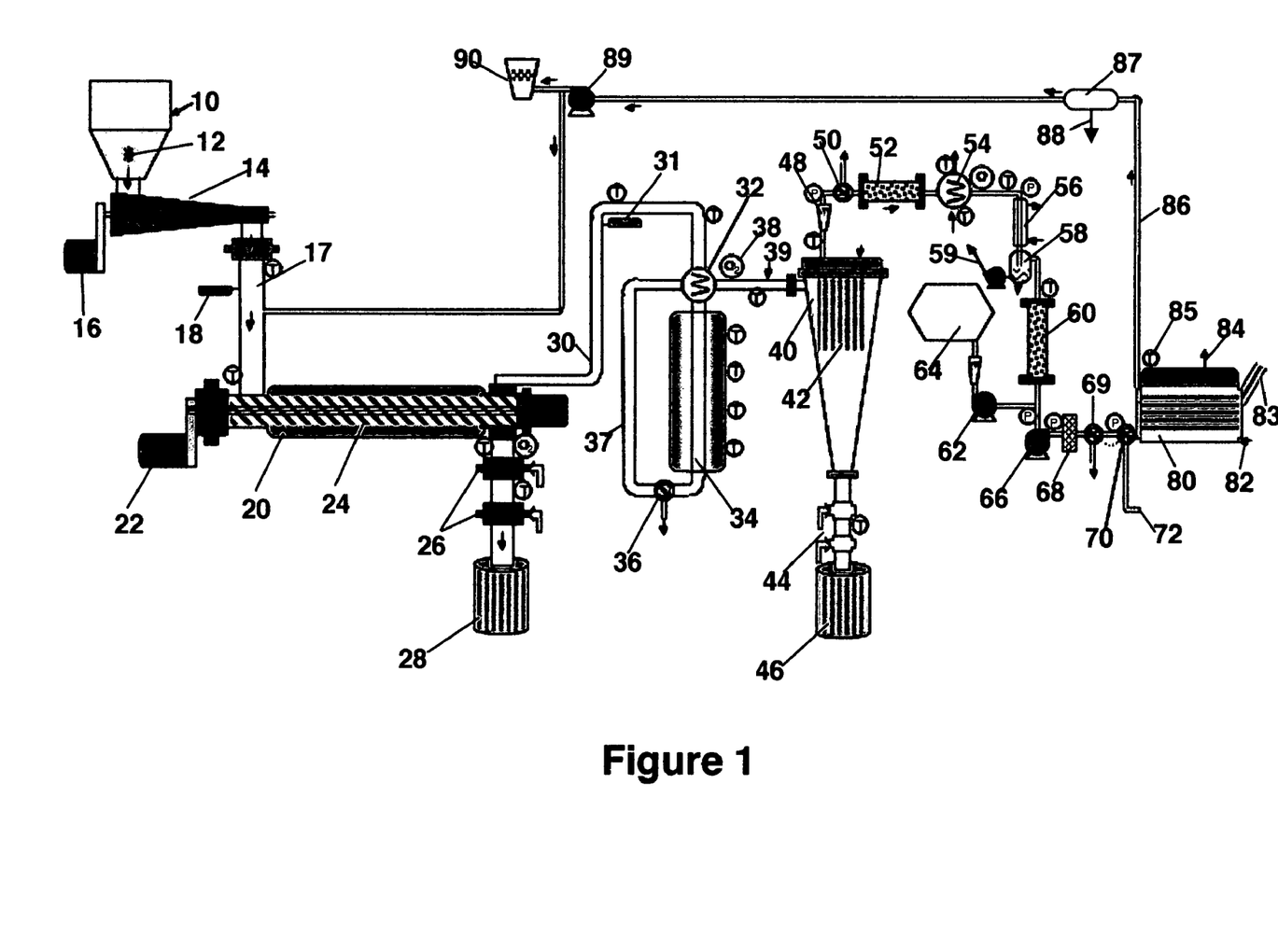
FIG. 1, shows the preferred embodiment involving the fuel cell protective interfacing using commercial components between a industry-standard rotary kiln, a candle filter, desulfurizing bed, condenser, granular activated carbon bed, and a sulfur getter bed and guard bed to protect the downstream fuel cell from being poisoned.

Referring to FIG. 1, the process train for interfacing the steam reformer to the fuel cell is shown and described as follows. Into hopper bin 10, is placed waste 12 which is fed to the dispensing screw 14, powered by motor 16. The waste is metered through conduit 17, augmented by steam injection via 18 into reformer screw 20, which is powered for rotation by motor 22. The waste is conveyed through the steam reformer kiln 20 from temperatures of 110° C. (200° F.) to about 500° C. (900° F.) by means of conveying screw 24, which adjust its rate of rotation forward and back to provide a jogging action to keep the waste agitated. The net forward progress of the screw 24 sets the correct residence time for proper steam reforming chemistry to occur. Steam reforming differs from general gasification, in that no oxygen is used and there is no internal combustion to provide the endothermic heat of reaction. After the waste is steam reformed to near completion, the inorganic solids drop out through lock-hopper ports 26 into the sealed container 28 below.

The gas so produced goes overhead via duct 30 and is augmented by the addition of superheated steam via port 31. This gas is then heated by heat exchanger 32 to about 1050° C. (1900° F.) so that it enters the steam reforming reactor 34, operating at about the same temperature. Should there be some kind of process upset, the syngas so produced in said reactor, can be diverted via valve 36 through a pipe not shown to CEB 90 for cleaning and discharge.

The gas said reactor 34 via conduit 37 and enters the heat exchanger 32, which cools the gas to about 480° C. (900° F.). The heat exchanger is of special design with special radiant tubes that avoid particulate deposits. The cooled syngas product is checked for any leaked oxygen from air via sensor 38, and lime can be added at port 39 for acid gas control before it enters the high temperature filter 40. The filter may consist of a pulsed tube candle filter (i.e. made by Fischer-Klostermann) that will capture any particulate material including the lime, which becomes deposited on said candle tubes 42 so that the syngas can pass and have its acid gases react and become neutralized. The filter 40 also removes any solid products of the steam reforming reactions, such as possible but undesirable soot. These solids are removed from said filter tubes by gas pulsing and they fall downward through lockhoppers 44 into a sealed container 46.

The syngas, now cleaned of fine particles, leaves the filter 40 where its flowrate is monitored by sensor 48. Should there be any process stoppage or upset downstream of this point, a diversion port 50 can divert the syngas via pipe not shown to the CEB 90 for discharge. The cleaned syngas next passes into the hot getter bed and desulfurizer 52 (i.e hot iron oxide, zinc oxide, or other bed) that removes sulfur-containing compounds, such as COS, $CO_2$, and many other poisons, etc. Now the cleaned and desulfurized syngas is rapidly quench-cooled by heat exchanger 54 in order to prevent any formation of polychlorinated dibenzo-dioxins or -furans. The syngas is further cooled by a chiller condenser 56, from which the condensate drains into condenser tank 58. To maintain level control in this tank, a discharge pump 59 removes any condensate build-up. In normal operation, this condensate is usually clean enough so that it can be used to make steam for injection into the process at ports 18 and 31.

The cold, cleaned syngas product in 58 next passes through an activated carbon polishing bed 60 that removes any low levels of volatile organics, volatile heavy metals, and silanes that could serve as poisons to the fuel cell. At this point the syngas product is intended to be of very high quality and is sampled by pump 62 and monitored by the fuel cell test cell and sampled into a gas summa canister continuously. Vacuum pump 66 pulls the gas through the whole process train and feeds this gas into HEPA filter (High Efficiency Particulate Air Filter) 68, which removes any very small, submicron particles that could coat the sensitive internals of the downstream fuel cell. Should this finished syngas product show any signs of poisoning the fuel cell test cell in this monitor 64, it would be considered off-spec and would be diverted via valve 69 to be discharged via CEB vent 90. Monitor 64 can also involve a gas chromatograph for detection of light gases up to just beyond benzene, sulfur-, chlorine- and nitrogen-containing organics. If this syngas is diverted away from the fuel cell 80, valve 70 would be proportioned so that natural gas entering at 72 would be substituted in place of the off-spec syngas in order that the fuel cell could continue to operate at its capacity, producing electricity, steam and heat. The fuel cell operating temperature would be monitored via sensor 85 to insure that this gas switch-over has not caused any serious temperature transient. If a temperature change is detected, the valve 70 would be automatically adjusted to feed the right amount of natural gas 72 into the fuel cell. The fuel cell produces electricity 83, as well as steam and $CO_2$ via ports 86. Air is fed into the fuel cell at port 82 and hot nitrogen leaves via port 84. This hot nitrogen stream provides useful heat for customer use. The said steam and $CO_2$ leaving via port 86 passes into a condenser 87 from which the water is removed via 88. The $CO_2$ stream leaving this condenser 87 is pulled along by pump 89 which discharges some gas via CEB 90 and the remaining gas is recycled into the waste fed port 17.

Figure 2:
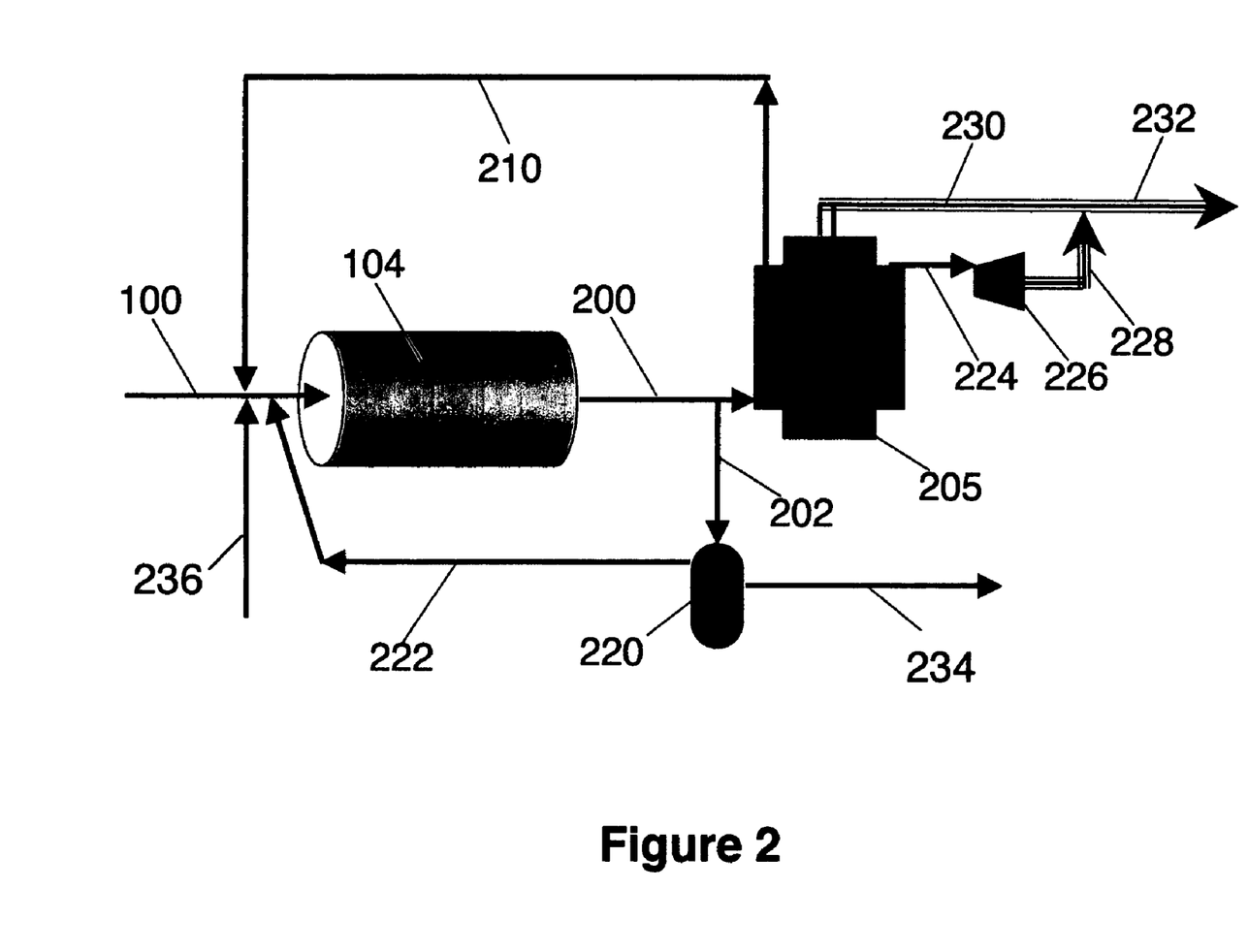
FIG. 2 shows the Fischer-Tropsch process in the interface to assist in carbon sequestration carbon balance in capturing nearly all of the carbon dioxide emissions.

Now referring to FIG. 2, a kiln and reformer 104 is shown interfaced to larger fuel cell 205 using the anode exhaust recycle 210 and the Fischer-Tropsch process 220 recycling the methane and light hydrocarbon waste gases via 222 back to the steam/$CO_2$ reforming kiln. Four streams consisting of the waste 100, the fuel cell anode exhaust 210 and the Fischer-Tropsch overhead stream 222 are combined with the proper amount of steam 224 to carryout the steam/$CO_2$ reforming inside the kiln 104. Particularly important to note is that these two recycle steams both involve greenhouse gases, $CO_2$ and $CH_4$, which would otherwise be released to the atmosphere. In the improved process these problem gases are not released to environment but profitably utilized. For example, a long forgotten reaction has been found, that has not been commercially exploited, and that can be accomplished is:

$$CH_4 + CO_2 \rightarrow 2H_2 + 2CO$$

This reaction equilibrium favors the $H_2$ and CO at temperatures around or above 700° C. (1300° F.) so that when the syngas leaves the kiln 104 in FIG. 2 where temperatures are around 1050° C. (1900° F.), this reaction is almost 100% completed. Note this consumes $CO_2$ and produces more syngas that can be used in the fuel cell as well as in Fischer-Tropsch. This reaction is favored at the high temperatures of the steam reformer wherein the syngas of $H_2$/CO ratio around 1.0 is produced. Also using the '465 patent and the '183 patent, the reaction:

$$CH_4 + H_2O \rightarrow 3H_2 + CO$$

can be accomplished in the steam reformer to produce a syngas of a $H_2$/CO ratio of 3, so the combination together with the waste and $CO_2$ can adjust the $H_2$/CO ratio to whatever Fischer-Tropsch needs (i.e. say a ratio of 0.7 to 1.75).

Here, using the empirical formula for typical municipal solid waste, two reactions are shown.

Reaction (1) Stoichiometric steam:

$$C_1H_{1.67}O_{0.47} + 0.53H_2O \rightarrow CO + 1.36H_2 \qquad (1).$$

In this case, 1 kg of waste will yield 1.45 kg of syngas.

In reaction (1), the conventional steam reforming uses a stoichiometric amount of steam to make just CO and $H_2$.

Reaction (2) Super-stoichiometric in $CO_2$ and $H_2O$:

$$C_1H_{1.67}O_{0.47} + 0.1CH4 + 0.25CO_2 + 0.38H_2O \rightarrow 1.35CO + 1.415H_2 \qquad (2)$$

By contrast to reaction (1), reaction (2) set forth below shows the improved reforming reaction, which involves a sub-stoichiometric amount of steam but has the light hydrocarbon Fischer-Tropsch overhead represented for simplicity by $CH_4$, added plus $CO_2$.

In this case, 1 kg of waste will yield 1.917 kg of syngas, which is a very significant 32.2% increase over 1.45 kg in the mass of valuable syngas product formed from a given mass of waste. And at the same time the amount of steam needed is almost halved—a significant reduction in cost.

This achieves the formation only of CO and $H_2$, and thus is super-stoichiometric which respect to the combination of steam plus $CO_2$. Thus, less steam (i.e., sub-stoichiometric) is required and greenhouse-problematic light hydrocarbons and $CO_2$ can be used in large amounts to achieve overall the stoichiometric conversion to syngas desired with a desirable $H_2$/CO ratio around 1.05. $CH_4$, and other light hydrocarbon greenhouse gases can be used in addition to the $CO_2$ to further adjust the $H_2$/CO ratio for the Fischer-Tropsch unit. Any other light gases that are also carried along with the waste $CH_4$ can go back to the steam reformer as well.

It is believed that it could even be economic to recycle 100% of the $CO_2$ and whatever optimum amount of $CH_4$ from Fischer-Tropsch to make the whole system balance, sequestering all of the $CO_2$ while making useful paraffin wax that is high in carbon content of high commercial value and not burned in its lifecycle. So in FIG. 2 the improved carbon sequestration can be accomplished as shown by the carbon balance. Thus, the carbon in the waste 100 combined with the carbon in the anode exhaust recycle 210 plus the carbon in the Fischer-Tropsch overhead recycle 222 is made to just equal the carbon in the Fischer-Tropsch product, paraffin wax 234. So what can be accomplished at the limit is the total sequestration of the carbon in the waste by the formation of the high carbon content paraffin wax. It will be obvious for one skilled in the art to identify other Fischer-Tropsch products that can be selected that will accomplish this total carbon sequestration. Commercially, there maybe be an economic optimum situation where one may not want to sequester all of the carbon in the waste, but this example shows that this is theoretically possible with this new concept while producing a syngas that is sufficiently clean for the high temperature fuel cell use at the same time. Being able to recycle impurities is a further advantage that one skilled in the art will appreciate.

Referring to FIG. 2, in addition to the above, the hot cathode exhaust 224 can be used in the turbine 226 to make power 228 which can be combined with fuel cell output 230 to yield commercial power 232. Finally other waste gases 236 can be added in the feed to the kiln 104.

Figure 3:
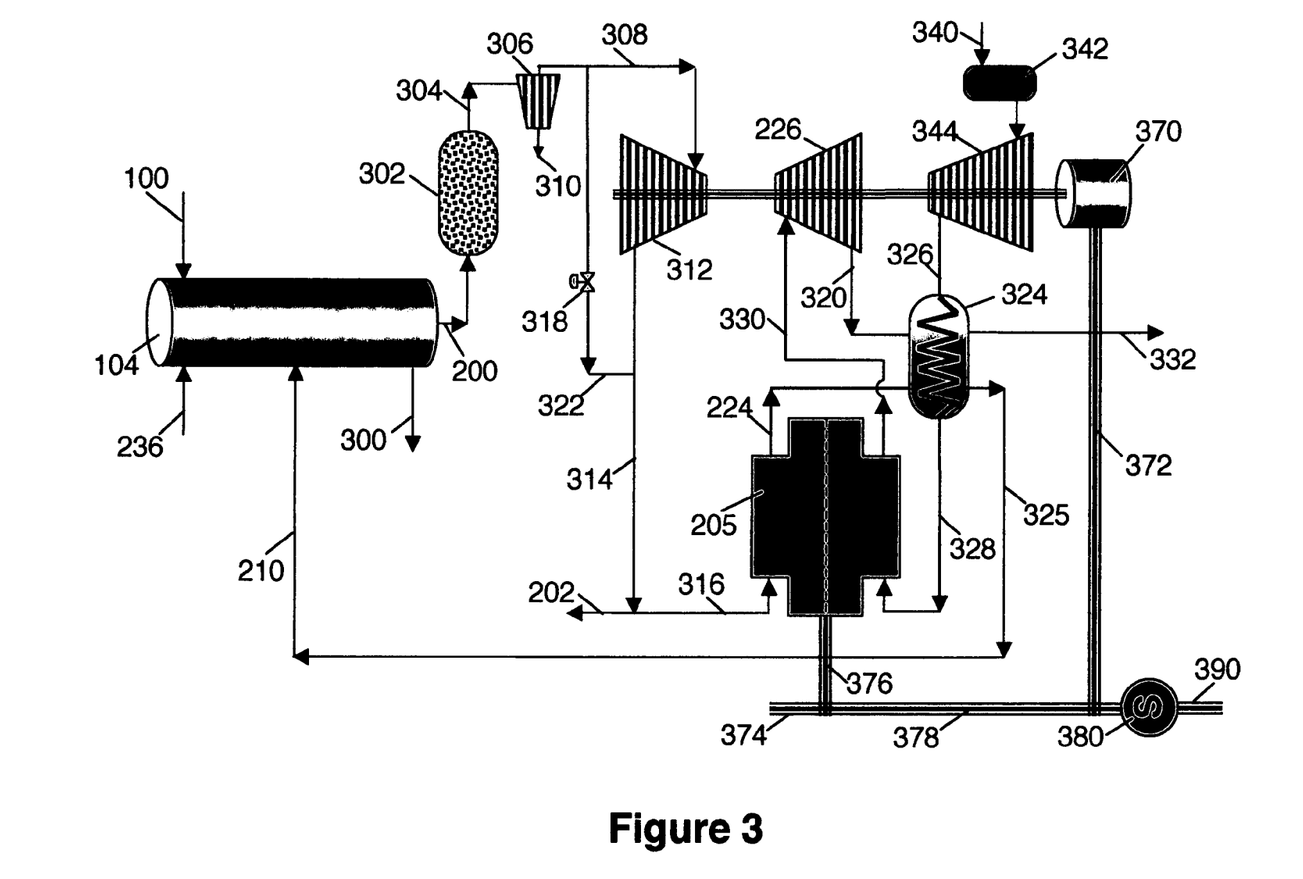
FIG. 3 shows the power recovery system making use of the hot syngas from the kiln and the fuel cells to extract electrical power and heat.

Referring to FIG. 3, there is shown the power recovery system making use of the hot syngas from the kiln and reformer 104 and the fuel cell 205 to extract electrical power and heat. The process begins with the waste 100 being fed into the rotary kiln 104. Other waste gases to be destroyed can be added via 236 also. The hot anode exhaust gas 210, containing the necessary steam and $CO_2$ is added to the kiln 104 to carry out the steam/$CO_2$ reforming chemistry in reaction (2) above. The waste 100 is reformed into about 85% syngas 200 and 15% inorganic solids 300 from the waste, consisting of glass, metal, carbon, etc., depending on the nature of the waste stream. The syngas 200 is cleaned and desulfurized in a hot getter bed 302, where sulfur-containing molecules are removed and some silicon-, phosphorus-, nitrogen-, and halogen-containing compounds as well. The purified syngas 304 now is fed into a high temperature candle filter 306, where solid particulate matter 310 is removed as well as any fines carried over from the getter bed 302. The hot, cleaned, particle-free syngas 308 enters into a Brayton turbine 312 where it is expanded and cooled to produce the warm, clean syngas 314 ready for feeding via 316 into the anode of the high temperature fuel cell 205. The manufacturers seem to want the syngas feed 316 to the fuel cell to be at ambient temperature or so, but this temperature can be adjusted upward via valve 318 in a bypass stream 322 as needed to maintain the temperature balance of the stream 214 and the fuel cell 205. The anode exhaust gases 224 consist mostly of steam and $CO_2$ plus a small fraction of un-oxidized syngas. This very hot syngas 224 that is around 650-750° C. (1200-1380° F.) can be heat exchanged in exchanger 324 to produce a hot anode exhaust stream 325 for use as feed 210 to the kiln. Very hot gas 330 exiting the cathode of the fuel cell 205 can be used for power recovery by entering turbine 226 where is expands and is cooled to form a warm stream 320 which can supply heat to this heat exchanger 324 and produces warm stream of nitrogen 332 that can be used for supplying heat to building domestic hot water, space heating, drying, industrial use, etc. The air 340 is filtered in filter 342 and compressed in compressor 344 to a higher pressure stream 326 and heated via heat exchanger 324 to supply the very hot cathode air stream 328 needed by fuel cell 205. The fuel cell produces DC electrical power 376, and together with the power 372 produced in the turbine generator 370 is electrically converted in inverter 380 into useful AC power 390. A portion of the generator power 372 not exported as 390 is power 378 which is combined with power from the fuel cell 376 to make up power 374 to operate the plant, such as heating the kiln, running motors, valves, and instrumentation and controls.

Examples of fuel cells that can accept syngas and are suitable for fuel cell 26 of the present invention include the Solid Oxide Fuel Cell manufactured by Westinghouse, Monroeville, Pa. or by Technical Management Inc., Cleveland, Ohio and the Molten Carbonate Fuel Cell manufactured by FuelCell Energy Corp., Danbury, Conn. The pertinent portion of the following references are incorporated by reference into this Detailed Description of the Invention: C. M. Caruana, "Fuel Cells Poised to Provide Power," Chem. Eng. Progr., pp. 11-21, September, 1996 and S. C. Singhal, "Advanced in Tubular Solid Oxide Fuel Cell Technology," Proceedings of the 4th International Symposium on Solid Oxide Fuel Cells, Pennington, N.J., Vol. 95-1, pp. 195-207 (1995).

EXAMPLE

The first step in the reduction to practice of the subject invention was to conduct experimental, small-scale pilot tests to reveal the identity and nature of the syngas produced. Accordingly, just completed was a gas test using the Bear Creek Pilot plant where solid waste was steam/$CO_2$ reformed to make syngas. The syngas composition is shown in Table 1 below.

TABLE 1

Results from Pilot Plant Gas Test By Steam/$CO_2$ Reforming Of Solid Waste

| | | | |
|---|---|---|---|
| $H_2$ | Hydrogen | 62.71 | vol % |
| CO | Carbon Monoxide | 18.57 | |
| $CO_2$ | Carbon Dioxide | 10.67 | |
| $CH_4$ | Methane | 7.58 | |
| $C_2H_6$ | Ethane | 0.48 | |
| $C_3$ TO $C_6$ | Propane through hexane | <0.01 | |
| $C_6H_6$ | Benzene | <17 | ppm |
| COS | Carbonyl Sulfide | 4 | ppm |
| $CS_2$ | Carbon Disulfide | 0.05 | ppm |
| $H_2S$ | Hydrogen Sulfide | <5 | ppm |
| $C_{10}H_8$ | Naphthalene | 2.6 | ppb |
| $C_{10}H_7CH_3$ | 2-Methylnaphthalene | ~0.6 | ppb |
| $C_{12}H_8$ | Acenaphthalene | ~0.4 | ppb |
| $C_{12}H_8O$ | Dibenzofuran | 0.36 | ppb |
| PCDF + PCDD | Polychlorinated-dibenzofurans + Dioxins | 0.0041 | ppt TEQ |

The pilot plant process configuration used to conduct these tests is described in a recent publication (T. R. Galloway, F. H. Schwartz and J. Waidl, "Hydrogen from Steam/$CO_2$ Reforming of Waste," Nat'l Hydrogen Assoc., Annual Hydrogen Conference 2006, Long Beach, Cailf. Mar. 12-16, 2006).

A common-knowledge process train was configured for cleaning the syngas: Standard chilled caustic scrubber, demister mat, carbon bed and HEPA filter, after which the product syngas was subjected to a very exhaustive chemical analyses. Three parallel gas sampling trains were used: gas-chromatography, GC-MS for volatile hydrocarbons, semi-volatile hydrocarbons, chlorine-containing compounds, and sulfur-containing compounds.

Lime addition to the kiln was used to neutralize and drop out halogen-containing compounds within the kiln. The standard scrubber, as widely used in industry for gas clean-up for removing hydrogen sulfide and hydrogen chloride, surprisingly was not successful in removing carbonyl sulfide, carbon disulfide, or polychlorinated organics. It was found that these compounds penetrated right through this syngas standard clean-up process train and that these latter compounds would be poisons to a molten carbonate or solid oxide high temperature fuel cell by the mechanism of chlorine or sulfur poisoning. The identification of these poisons was a significant discovery that will help promote fuel cells in this waste field.

Volatile heavy metals can also poison the fuel cell and the collected solids in the scrubber were analyzed for such heavy metals and they were mostly removed. Highly volatile heavy metals, such as mercury or heavy metal chlorides or fluorides would not be removed by this scrubber since they would go overhead. The pilot tests showed that chilling down to 60° F. did not reduce the heavy metal halides down to acceptably low levels. Again, an active getter bed is required as described in detail above.

The scrubbed syngas was next fed to a room temperature demister mat, onto which a steadily increasing deposit of fine soot-like particles was deposited. Analysis of the pressure drop across this demister during the run found it to show a steady, linear increase in pressure drop as the deposit layer built up on the upstream face. These deposits were not analyzed, because they are removed and very minor in mass. The downstream side of this demister filter remained clean and white throughout the entire run. Deposits appeared to be soot with a slight odor of naphthalene.

In the pilot plant, the syngas leaving the demister was next fed into a cool granular activated carbon bed, which was designed to capture the volatile organics and volatile heavy metals that reached this point. The carbon bed was found to remove a great amount of these minor constituents and quickly became saturated throughout its entire length and broke through about 2 hours into the 3 hour medical waste feed period. The carbon load is believed to be mostly benzene and low molecular weight volatile chloro-organics. These performance data allow for the full-size carbon bed to be designed.

The final step in the syngas cleanup was the HEPA filter, which worked very well during the whole run, not showing any build up in pressure from entrained fines or humidity; however, there was a substantial amount of volatile heavier hydrocarbons and sulfur- and chlorine-containing hydrocarbons that got through: benzene<16 ppm, naphthalene=2.6 ppb, methylnaphthalene=0.6 ppb, acenaphthalene=0.4 ppb, and non-chlorinated dibenzofuran=0.36 ppb, polychlorinated dibenzodioxin and dibenzofuran TEQ=0.0041 ppt, COS=4 ppm, and CS2=0.05 ppm. H2S was below level of detection so the chilled scrubber did well on H2S, as well as HCl showing that alkali neutralization was effective in their removal.

The very small, diminimis, but still detectable polychlorinated dibenzodioxin and dibenzofurans were probably formed at the cooler end of the process train, since they are not formed during the steam reforming process. Their formation was probably before the quenching portions of the scrubber.

What has been found was that the syngas was very rich in hydrogen and carbon monoxide—most suitable for a variety of high temperature fuel cells (such as molten carbonate, solid oxide, and similar fuel cells.). And the minor contaminants, such as carbonyl sulfide, hydrogen sulfide, carbon disulfide, hydrogen chloride, and polychlorinated organics were identified and a removal system specified.

It was learned that to achieve a highly pure syngas, with negligible impurities, the pilot experimental work has shown that the syngas must be purified by a combination of high temperature removal steps as well as low temperature condensation steps. This double-prong approach is required because syngas clean-up is quite difficult in order to achieve a clean syngas that can feed either or both of high temperature fuel cells and shift converter and pressure swing absorption unit for hydrogen production. FIG. 1 shows such a process train that corrects scrubber sulfur-compound removal problems by using a high temperature alloy candle filter operating about 500° (900° F.) or higher, so that the soot precursor solids are dropped out early at high temperature avoiding the formation of dioxins and dibenzofurans.

The significant improvements in this process train compared to that pilot-tested, as discussed earlier, are shown in FIG. 1 below and involve alkali addition to the kiln and the hot filter and getter bed units immediately downstream of the steam reformer. Since soot particles were observed and smelled of naphthalene and its heavier cousins in the scrubber caustic and also on the upstream face of the demister, these heavy polyaromatic solids should be removed early at relatively high temperature so that they do not act as precursors to larger quantities of soot formation downstream in the sections of process that are cooling below 300 to 500° C. (600 to 900° F.), the temperature range over which the "de-novo" synthesis chemistry is active in forming soot, polyaromatic hydrocarbons, and polychlorinated dibenzo-dioxins and furans.

The added getter bed (hot iron oxide, zinc oxide, or equivalent) would function as an active getter bed to trap and destroy low molecular weight sulfur compounds such as carbonyl sulfide and carbon disulfide as well as halogen-, silicon-, nitrogen- and phosphorus-containing compounds. These compounds are not very acidic and therefore are not efficiently removed in a chilled caustic scrubber system. Thus, they should be removed earlier in a getter bed-type unit at the higher temperature where they can efficiently react.

Following the getter bed, a water-cooled heat exchanger/boiler is shown that will rapidly quench-cool the syngas down from 300 to 500° C. (600 to 900° F.) temperature of the getter bed down to 150° C. (300° F.). The concept here is to rapidly quench the syngas so that the undesirable heavy hydrocarbon recombination reactions (i.e. "De-Novo") do not have time to form, since they are kinetically limited. These recombination reactions involve multi-step polymerization &/or ring formation that are slowed as the temperatures are lowered.

Next, the chilled condenser is shown in FIG. 1 that would replace the more complex chilled caustic scrubber used earlier in the pilot tests. In this embodiment the chiller condenser configuration was used extensively in the earlier testing, as well as during a nuclear generating station decommissioning project. The amount of acid gases from these wastes, from medical waste, and from MSW tested were small and nearly completely neutralized by the formation of ammonia during steam reforming, where this ammonia neutralized the last small amounts of acid gases. Thus, the need for high concentrations of caustic was not necessary to maintain a scrubber liquid pH of around 10. This function was replaced by a pH-controlled condensate tank just below the chiller operating at 4° C. (40° F.). The condensate water in this collection tank was used as the boiler water feed, since its quality was acceptable, even though it was monitored for added assurance. For radioactive wastes, it was obviously critical not to have a secondary radioactive waste stream from the process, such as condensate water, sent to drain. In this way, the water balance was fairly well maintained with little make-up or discharge.

The adsorption bed (i.e. granular activated carbon or equivalent) is the final trap for light hydrocarbons and the more volatile of the heavy metals and silanes. It operates best at room temperature or below being fed clean syngas, mostly free of entrained or formed fine particulate. The sorption beds would consist of multiple beds that would permit their stripping and reactivation as well as having the security of tandem beds to avoid the consequence of premature bed breakthrough in case of process upset. The stripped volatile organic compounds (VOCs) from the sorption bed reactivation are fed back into the steam reformer for destruction.

Downstream of this adsorber bed is the syngas monitoring function: fuel cell test cell and gas sample. This process function is critically important in order to protect against damaging the fuel cell sensitive electrochemical catalysts, which can be poisoned with parts per million levels of sulfur- or chlorine-containing compounds, volatile heavy metals, as well as silanes. Not only must the on-line monitor be extremely sensitive to all potential and even unknown poisons at very low levels, but also it must be very fast in order to detect such poisons before they enter and poison the fuel cell. This can be accomplished by the novel concept of a sacrificial fuel cell test cell that contains a number of SOFC ceramic tubes operating under the equivalent conditions as those of the full-size commercial fuel cell producing the power, steam and heat in this energy-from-waste plant. The voltage and current output of these tubes are accurately and carefully monitored so that any statistically significant decline in performance can be detected, quickly.

If such poisoning effect is detected, the "#1 Divert to CEB" valve is actuated to send the syngas to the CEB vent system. At the same time the calorimeter controller adds natural gas to the fuel cell at the proper amount so as not to subject the cell to a large calorimetric change in heat content. In this way, the fuel cell continues in its operation without seeing the syngas contaminated with the poison. In addition, this fuel cell test cell is in duplicate with a hot standby test cell operating on natural gas, so that the poisoned test cell that just triggered the syngas diversion is switched out of service and the hot standby test cell is switched into service. With the poisoned test cell out of service and cool, its side is opened and the tubes removed and replaced with fresh tubes. These tubes are not expensive (i.e. cost around $5 each) and are a process consumable. These tubes can then be sent to an analytical laboratory where they are split in a clean room by diamond saw and analyzed by Auger ESCA (Electron Spectroscopy for Chemical Analysis), or electron micro-probe for surface contaminate deposit layer thickness and characterization. This analytical method will evaluate the seriousness of the poison incident and allow the process operators to see if any change in plant operation (or configuration) is needed. For example, there can always be poisons that have been previously unknown and not experienced before in the waste stream being processed. In this way, this concept of sacrificial SOFC test fuel cell tubes being used as a process monitor, on-line and real-time, is novel and very valuable in order to protect the large capital investment of a large fuel cell.

Also in this monitoring function is the gas sampling operation that allows for a gas sample to be removed at short notice. The gas is being fed continuously through a Summa canister (or equivalent) so that as long as the process is functioning well, the canister is continually being flushed with a fresh sample. But as soon as some test cell poisoning is detected, this canister is switched off-line, so that it can be removed and sent off to an analytical laboratory for detailed gas analysis to further support the electron-probe surface analysis of the sacrificial SOFC tubes.

Further, without departing from the spirit and scope of this invention, one of ordinary skill in the art can make various other embodiments and aspects of the process and system of the present invention to adapt it to specific usages and conditions. As such, these changes and modifications are properly, equitably, and intended to be, within the full range of equivalents of the following claims.

What is claimed is:

1. A process for converting carbonaceous feedstocks into energy without the production of unwanted greenhouse gas emissions comprising:
   (a) converting a carbonaceous feedstock selected from the group consisting of coal, hydrocarbon oil, natural gas, petroleum coke, oil shale, carbonaceous-containing waste oil, carbonaceous-containing medical waste, carbonaceous-containing military waste, carbonaceous-containing industrial waste, carbonaceous-containing medical waste, carbonaceous-containing sewage sludge and municipal solid waste, carbonaceous-containing agricultural waste, carbonaceous-containing biomass, biological and biochemical waste, and mixtures thereof, and a greenhouse gas stream in a gasification unit to synthesis gas comprising carbon monoxide and hydrogen, said gasification unit is a non-catalytic high temperature, gas-phase reactor operating at conditions to achieve a gas exit temperature of from at least 700° to about 1600° C. (1300-2900° F.);
   (b) passing at least a portion of said synthesis gas to an interface zone to remove compounds selected from the group consisting of sulfur-containing, silicon-containing, halogen-containing, phosphorus-containing, and nitrogen-containing compounds and their mixtures from said syngas to form a cleaned syngas, said interface zone comprises in flow sequence:
      (i) a high temperature filter operating in the range of about 400 to 600° C. (750-1100° F.),
      (ii) a high temperature getter bed reactor operating in the range of about 400 to 600° C. (750-1100° F.),
      (iii) a condenser operating in the temperature range of about 0 to 15° C. (32-50° F.);
   (c) electrochemically oxidizing at least a portion of said cleaned syngas from said condenser in a first half-cell of a fuel cell (anode) to a first half-cell exit gas comprising carbon dioxide and water;
   (d) recovering the carbon dioxide from said first half-cell exit gas to serve as at least 20% of said greenhouse gas stream in step (a); and
   (e) electrochemically reducing an oxygen-containing gas in a second half-cell of said fuel cell (cathode) completing the circuit and resulting in the production of electrical energy.

2. The process of claim 1 wherein said synthesis gas from said gasification unit is cooled in a heat exchanger prior to entering said interface zone and wherein said heat exchanger is used to preheat said greenhouse gas stream to said gasification unit.

3. The process of claim 1 wherein said high temperature filter removes particulate matter from the synthesis gas.

4. The process of claim 1 wherein said getter bed reactor removes sulfur-containing light hydrocarbons by a reaction with a bed material.

5. The process of claim 4 wherein the cleaned syngas from said getter bed is rapidly quenched to a temperature in said condenser to slow down recombination reactions.

6. The process of claim 1 wherein said cleaned syngas from said condenser is continuously monitored to determine its fuel cell poisoning characteristics by passing a small slip stream of said cooled synthesis gas to a fuel cell tester stack having sacrificial fuel cell electrodes.

7. The process of claim 6, wherein the cleaned syngas is continuously monitored during the operation of the process to prevent damage to said fuel cell from harmful materials selected from the group consisting of poison, corrosive materials, particulate materials, and mixtures thereof.

8. The process of claim 7, wherein the continuously monitored cleaned syngas during the operation of the process is carried out by passing a small slip stream to an on-line process gas chromatograph for detection of light gases and sulfur-containing, chlorine-containing, and nitrogen containing organic materials.

9. The process of claim 1, wherein said gasification unit is a single duplex rotary kiln having a primary region having a hollow flight screw to process the solid waste and a second region having conductively heated annular surfaces to heat the gases to temperatures from about at least 700 to about 160° C. (1300-2900° F.).

10. The process of claim 1, wherein cleaned syngas from said interface zone passes to a Fischer Tropsch synthesis reactor system for producing a high carbon content compound.

11. The process of claim 10, wherein said Fischer Tropsch synthesis reactor converts said cleaned syngas into paraffin wax.

12. The process of claim 11, wherein light gases from said Fischer Tropsch synthesis reactor are recycled back to said gasification unit.

13. The process of claim 10, wherein cleaned syngas from said interface zone is passed to a pressure swing absorption unit to convert the synthesis gas to hydrogen fuel.

14. The process of claim 13, wherein said hydrogen from said pressure swing absorption unit and carbon dioxide are recycled back to said gasification unit to adjust the hydrogen/carbon monoxide ratio for optimum utilization in said Fischer Tropsch synthesis reactor system.

15. The process of claim 1, wherein said high temperature filter is a high efficiency particulate air filter (HEPA) and a guard bed to further protect the fuel cell.

16. The process of claim 15, wherein the high temperature filter contains a HEPA filter and a guard unit to protect the Fischer Tropsch catalyst.

17. The process of claim 1, wherein said greenhouse gas stream is carbon dioxide.

* * * * *